Jan. 19, 1954 A. PACKARD 2,666,867
SWITCHING CIRCUIT
Filed Dec. 27, 1950
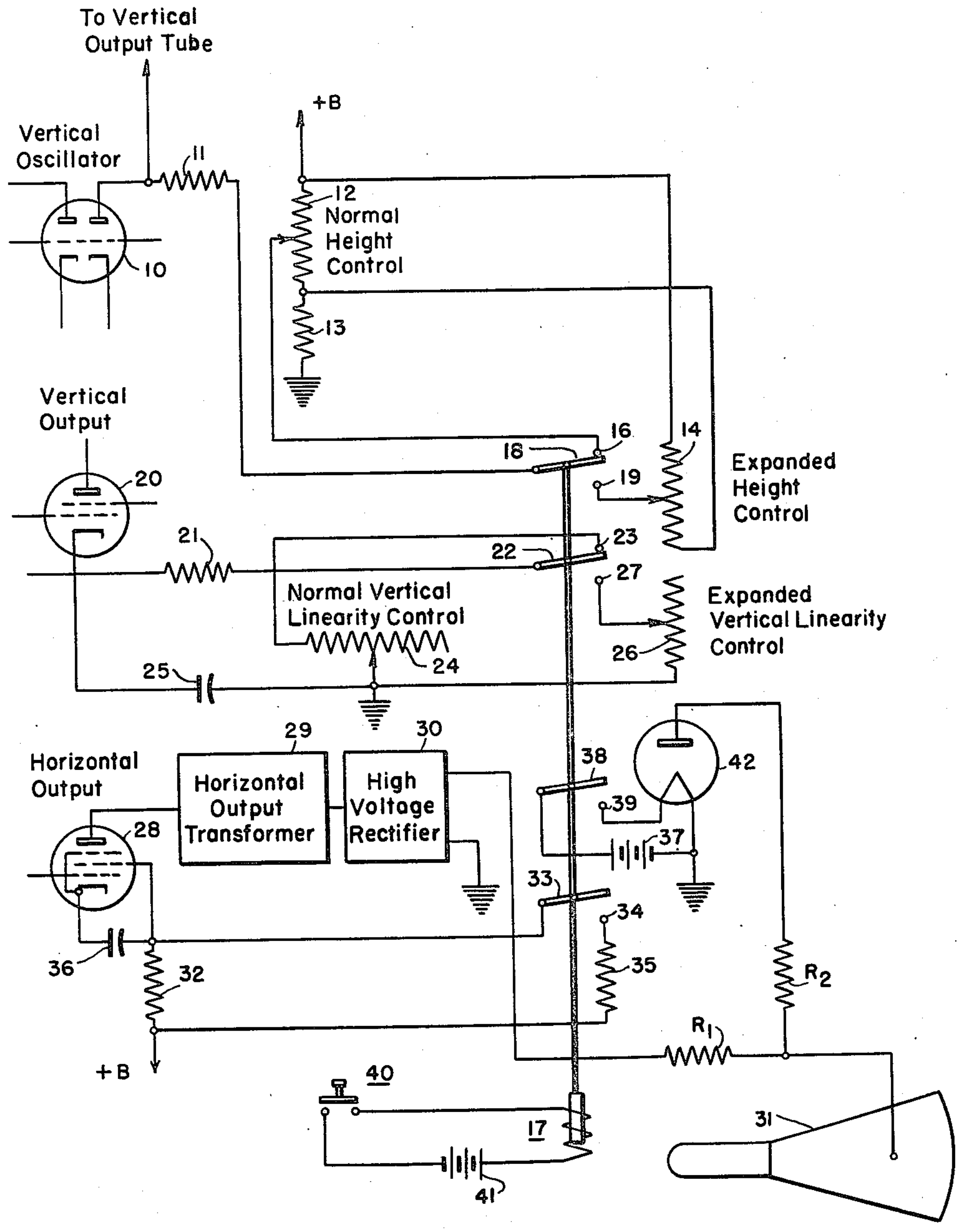
WITNESSES:
E. A. McCloskey
Wm. C. Groome
INVENTOR
Alden Packard.
BY
F. E. Browder
ATTORNEY Patented Jan. 19, 1954

2,666,867

UNITED STATES PATENT OFFICE 2,666,867

SWITCHING CIRCUIT

Alden Packard, Sunbury, Pa., assignor to Westinghouse Electric Corporation, East Pittsburgh, Pa., a corporation of Pennsylvania Application December 27, 1950, Serial No. 202,868

5 Claims. (Cl. 315—19)

This invention relates to cathode ray tube circuits, and relates more particularly to picture tube circuits of television receivers.

In some television receivers, circuits for the electronic enlargement of the central portions of the pictures are provided. These usually include relays energized by push-buttons which, when enlargement of the pictures is desired, close circuits which insert resistors in the height, vertical linearity and horizontal deflection circuits, which so modify these circuits that the desired enlargement is provided.

In a television receiver where the direct current, high voltage for the second anode of the picture tube is provided by a rectifier tube connected to a horizontal output transformer, a so-called "fly-back" voltage supply, the modification of the horizontal deflection circuit for causing increased picture size, also increases the second anode voltage of the picture tube since such voltage is derived from the same circuit which generates the horizontal scanning current. This increase in voltage opposes the desired increase in width and height of the picture, since the angles through which the electron beam is deflected, for a given flux density, is inversely proportional to the square root of the second anode voltage. It is desirable, therefore, when expanding the picture, to reduce the second anode voltage to, for example, the same value that it had before picture expansion. This may be accomplished by closing a switch in a voltage divider circuit connected to the second anode of the picture tube, but the usual switch would not be satisfactory for this purpose since when the switch is opened, the entire second anode potential appears across its contacts. A switch which would operate satisfactorily without arcing-over on opening, would be large and expensive.

This invention provides a voltage divider circuit for reducing the second anode voltage of a television picture tube when it is desired to enlarge the picture on the face of the tube, using a simple, inexpensive switch which closes the filament circuit of a diode vacuum tube which conducts and closes the voltage dividing circuit. The only voltage appearing across the switch when it is opened, is the relatively low filament voltage of the tube.

An object of the invention is to provide a simple, inexpensive, voltage reducing circuit for the second anode of a cathode ray tube.

Another and more definite object of the invention is to enlarge the picture on the face of a television picture tube, the second anode of which is provided with voltage from a fly-back type supply, and to reduce the voltage to the second anode of the picture tube with a simple, inexpensive, voltage dividing circuit when the picture is enlarged.

The invention will now be described with reference to the drawing which is a circuit schematic illustrating one embodiment of the invention.

A vertical oscillator tube 10 has a plate connected through the resistor 11 to the armature 18 of the relay 17. The normal height control potentiometer 12 is connected at one end to a positive terminal (B+) of a suitable plate voltage supply source which is not illustrated, and at its other end, through the resistor 13, to ground. The junction point of the potentiometer 12 and the resistor 13 is connected to one end of the expanded height control potentiometer 14, the other end of which is connected to B+. The slider of the potentiometer 12 is connected to the contact 16 of the relay 17. The armature 18 of the relay normally is in contact with the contact 16, and is connected to B+. The slider of the potentiometer 14 is connected to the relay contact 19 normally spaced from the relay armature 18.

A vertical output tube 20 has its cathode connected through the resistor 21 to the armature 22 of the relay 17, which armature normally touches the contact 23 which is connected to one end of the normal vertical linearity, variable control resistor 24, the slider of which is connected to ground, and through the capacitor 25 to the cathode of the tube 20. The expanded vertical linearity control 26 is connected at one end to ground, and its slider is connected to the relay contact 27 normally spaced from the relay armature 22.

A horizontal output tube 28 has its plate connected to a horizontal output transformer 29 which is connected to a high voltage rectifier 30, the direct current, high voltage output of which is supplied through the resistor $R_1$ to the second anode of the picture tube 31. The screen grid of the tube 28 is connected through the normal screen grid resistor 32 to B+, and to the relay armature 33 which is normally spaced from the relay contact 34, and is connected through the capacitor 36 to the cathode of the tube 28. The resistor 35 is connected at one end to B+ and at its other end to the relay contact 34.

The resistor $R_2$ is connected at one end to that end of the resistor $R_1$ which is connected to the second anode of the picture tube, and is connected at its other end to the plate of the diode rectifier tube 42. One side of filament of the tube 42 is connected to ground and to one side of the battery 37, the other side of which is connected to the relay armature 38 which is normally spaced from the relay contact 39. The armature 38 is connected to the other side of the filament of the tube 42.

The energizing winding of the relay 17 is connected, when the push button switch 40 is closed, to the battery 41. Normally when an enlarged picture is not desired, the switch 40 is open and the relay 17 deenergized. The expanded height control potentiometer 14, the expanded vertical linearity control potentiometer 26 and the screen grid resistor 35 are normally disconnected from the tube circuits. Likewise, the resistor $R_2$ is normally disconnected from ground through the tube 42 being normally non-conductive. The normal height control 12, the normal vertical linearity control 24, and the normal screen grid resistor 32 are connected to the tube circuits for providing a normal picture.

When an enlarged picture is desired, the switch 40 is closed and the relay 17 energized. The relay then pulls down its armatures 18, 22, 33 and 38, causing the armature 18 to be spaced from the relay contact 16 and to touch the relay contact 19. This disconnects the slider of the normal height control potentiometer 12 from, and connects the slider of the expanded height control potentiometer 14, to the resistor 11 in the plate circuit of the vertical oscillator tube 10.

At the same time the relay armature 22 becomes spaced from the relay contact 23 and touches the relay contacts 27. This disconnects the resistor 21 in the cathode circuit of the vertical output tube 20, from the normal vertical linearity control resistor 24, and connects it to the slider of the expanded vertical linearity control 26.

At the same time the relay armature 33 touches the relay contact 34 and connects the screen grid resistor 35 in shunt with the screen grid resistor 32.

Connecting the controls 14 and 26 and the screen resistor 35 in the tube circuits as described, tends to cause an enlarged picture, but as mentioned previously, this action is opposed by the rise in the voltage delivered to the second anode of the picture tube as a result of the lowering of the resistance of the screen grid circuit of the horizontal output tube 28. For reducing this voltage so that the picture can properly be enlarged, when the relay 17 is energized, its armature 38 touches the contact 39, closing the energizing circuit of the filament of the diode tube 42, causing it to conduct and to connect the resistor $R_2$ to ground. This completes a voltage divider circuit including the resistors $R_1$ and $R_2$, causing the second anode voltage of the picture tube to be reduced to a value $$E' = \frac{R_2}{R_1 + R_2}(E)$$

where E is the voltage of the high voltage rectifier 30.

By proper selection of the value of the resistors $R_1$ and $R_2$, E may be made to have the same value as the normal second anode voltage.

The diode tube may be of the type used as a high voltage rectifier in television receivers and which requires a filament voltage of only one to two volts, which voltage appears across the relay contact 39 and the relay armature 38 when the relay 17 is deenergized, instead of the high voltage of the second anode of the picture tube 31.

I claim as my invention:

1. In combination with a television picture tube having a second anode, a circuit for generating a horizontal scanning current for said tube and for supplying direct current voltage to said anode, means for modifying said circuit for increasing the horizontal scanning angle of the electron beam of said tube, means operated concurrently with said last mentioned means for reducing the voltage at said anode, said means comprising an electron tube and a resistor connected in series to said anode and to ground, and means for causing said electron tube to conduct.

2. The invention claimed in claim 1 in which the last mentioned means includes a cathode in the electron tube, and means for heating the cathode.

3. The invention claimed in claim 2 in which the cathode is a filament.

4. In combination with a television picture tube having a second anode, a circuit for generating a horizontal scanning current for said tube and for supplying high voltage, direct current, to said anode, an auxiliary circuit for modifying said circuit for increasing the horizontal scanning angle of the electron beam of said tube, a switch for closing said auxiliary circuit, a voltage dividing circuit including a resistor connected between said anode and the first mentioned circuit, an electron tube having an anode and a grounded filament, a resistor connected between said anodes, a circuit for heating said filament, a switch for closing the last mentioned circuit, and means for concurrently closing said switches.

5. In combination with a cathode ray tube having a second anode, a direct current high voltage source for said anode, a first resistor connected between one side of said high voltage source and said anode, an electron tube having a filament and a cathode, means connecting the filament of said electron tube to the side of said high voltage source opposite the side to which said first resistor is connected, a second resistor connected between said anode of said cathode ray tube and said anode of said electron tube, a circuit for heating said filament of said electron tube, and a switch for closing the circuit for heating said filament of said electron tube and concurrently connecting said second resistor to the side of said high voltage source opposite the side to which said first resistor is connected.

ALDEN PACKARD.

References Cited in the file of this patent

UNITED STATES PATENTS

| Number | Name | Date |
|---|---|---|
| 2,098,390 | Iams | Nov. 9, 1937 |
| 2,121,760 | Lowry et al. | June 21, 1938 |
| 2,276,455 | Beers | Mar. 17, 1942 |
| 2,300,452 | Lewis | Nov. 3, 1942 |
| 2,438,359 | Clapp | Mar. 23, 1948 |
| 2,443,030 | Foster | June 8, 1948 |
| 2,449,969 | Wright | Sept. 28, 1948 |
| 2,510,670 | Trott | June 6, 1950 |
| 2,512,779 | Sherwin et al. | June 27, 1950 |
| 2,543,719 | Clark | Feb. 27, 1951 |
| 2,555,829 | Barco | June 5, 1951 |
| 2,559,078 | Kell | July 3, 1951 |
| 2,564,588 | Wendt | Aug. 14, 1951 |